United States Patent
Hwang et al.

(10) Patent No.: US 9,007,536 B2
(45) Date of Patent: Apr. 14, 2015

(54) LIQUID CRYSTAL DISPLAY AND METHOD FOR MANUFACTURING THE SAME

(75) Inventors: Seong Mo Hwang, Seongnam-si (KR); Hyeon Yong Jang, Hwaswong-si (KR); Jae Jin Pyun, Hwaseong-si (KR); Il Ho Lee, Hwaseong-si (KR); Moon Jung Baek, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 512 days.

(21) Appl. No.: 13/330,303

(22) Filed: Dec. 19, 2011

(65) Prior Publication Data

US 2012/0212701 A1    Aug. 23, 2012

(30) Foreign Application Priority Data

Feb. 18, 2011    (KR) .................. 10-2011-0014673

(51) Int. Cl.
*G02F 1/1339* (2006.01)
*G06F 3/041* (2006.01)

(52) U.S. Cl.
CPC .......... *G06F 3/0412* (2013.01); *G02F 1/13394* (2013.01)

(58) Field of Classification Search
CPC .... G06F 3/0412; G06F 3/045; G02F 1/13394
USPC .......... 349/12, 139, 155, 156, 110, 122, 157; 345/173, 174; 445/24
See application file for complete search history.

(56) References Cited

U.S. PATENT DOCUMENTS

| | | | |
|---|---|---|---|
| 2009/0096764 A1* | 4/2009 | You ............................... | 345/174 |
| 2011/0001723 A1* | 1/2011 | Fan ............................... | 345/174 |
| 2011/0273396 A1* | 11/2011 | Chung, II ....................... | 345/174 |

FOREIGN PATENT DOCUMENTS

KR    10-0902075    6/2009

OTHER PUBLICATIONS

Computer-generated English translation of KR 10-0902075, Jun. 2009, pp. 1-30.*

* cited by examiner

*Primary Examiner* — Dung Nguyen
*Assistant Examiner* — Tai Duong
(74) *Attorney, Agent, or Firm* — H.C. Park & Associates, PLC

(57) ABSTRACT

A liquid crystal display is provided that includes: a first display panel including a thin film transistor and a plurality of pixel electrodes; a second display panel facing the first display panel with a cell gap therebetween; a lower resistive layer disposed on the first display panel; an upper resistive layer disposed on the second display panel; and a sensing spacer connecting the lower resistive layer and the upper resistive layer.

15 Claims, 20 Drawing Sheets

LIQUID CRYSTAL DISPLAY AND METHOD FOR MANUFACTURING THE SAME

CROSS-REFERENCE TO RELATED APPLICATION

This application claims priority to and the benefit of Korean Patent Application No. 10-2011-0014673, filed on Feb. 18, 2011, which is hereby incorporated by reference for all purposes as if fully set forth herein.

BACKGROUND OF THE INVENTION

1. Field of the Invention

Exemplary embodiments of the present invention relate to a liquid crystal display and a manufacturing method thereof.

2. Discussion of the Background

Liquid crystal displays are now one of the most widely used type of flat panel display. A liquid crystal display has two display panels, on which field generating electrodes such as pixel electrodes and a common electrode are formed. A liquid crystal layer is interposed between the display panels. In the liquid crystal display, a voltage is applied to the field generating electrodes, so as to form an electric field in the liquid crystal layer. The alignment of liquid crystal molecules of the liquid crystal layer is determined by the electric field, and the polarization of incident light is controlled, to thereby display and image.

The functions of a liquid crystal display are executed by using various input devices. In recent years, touch panel input devices have become increasingly popular.

A touch panel is a device that allows a user to operate a machine by using a finger or a touch pen (or stylus) to write or draw characters or execute icons displayed on the touch panel. A display device attached to the touch panel or included in the touch panel determines where the screen is touched, to thereby display an image.

A touch panel may be a resistive-type, a capacitive-type, an electro-magnetic-type (EM), or an optical-type, in accordance with a touch detection method thereof. In general, in the resistive-type, transparent electrodes having a resistance component are disposed facing each other on two opposing substrates. If pressure is applied to the electrodes, a voltage is applied to the transparent electrodes by the resistance component. Accordingly, the resistance components of the two transparent electrodes are connected like in a parallel resistance coupling, a change of resistance is generated, and a voltage is changed by the current flowing though the two transparent electrodes. A contact position may be recognized by the voltage change.

The two transparent electrodes are formed with the predetermined gap for maintaining an opened state. However, the sensitivity is decreased according to the size of the gap and/or production yields may be decreased by deterioration of the products.

The above information disclosed in this Background section is only for enhancement of understanding of the background of the invention and therefore it may contain information that does not constitute prior art.

SUMMARY OF THE INVENTION

The present invention provides a liquid crystal display including a sensing spacer formed of a material transmitting a current when pressure is applied thereto, and a manufacturing method thereof.

Additional features of the invention will be set forth in the description which follows, and in part will be apparent from the description, or may be learned by practice of the invention.

A liquid crystal display, according to an exemplary embodiment of the present invention, includes: a first display panel including a thin film transistor and a plurality of pixel electrodes; a second display panel facing the first display panel across a cell gap; a lower resistive layer disposed on the first display panel; an upper resistive layer disposed on the second display panel; and a sensing spacer connecting the lower resistive layer and the upper resistive layer.

The sensing spacer may substantially be an insulator when an external force is not applied thereto.

The resistance of the sensing spacer may change in accordance with an amount of external force that is applied to the second display panel.

The resistance of the sensing spacer may be reduced when an external force is applied to the second display panel, resulting in current flow between the upper resistive layer and the lower resistive layer.

The thickness of the sensing spacer may be substantially a same as the thickness of the cell gap.

The sensing spacer may directly contact the lower resistive layer and the upper resistive layer.

A cell gap spacer disposed on at least one of the first display panel and the second display panel to maintain the cell gap may be further included.

The second display panel may include a color filter and a light blocking member, and the sensing spacer may be disposed at a region overlapping the light blocking member.

The lower resistive layer may be disposed between the pixel electrodes.

The lower resistive layer may be disposed at a same layer as the pixel electrodes.

The pressure sensing layer comprises a quantum tunneling composite material having a resistance that varies according to an amount of force applied thereto.

A liquid crystal display, according to another exemplary embodiment of the present invention, includes: a first display panel; a second display panel having a lower surface that faces the first display panel and an opposing an upper surface of the second display panel; a liquid crystal layer disposed between the first display panel and the second display panel; a first resistive layer disposed on the upper surface of the second display panel and extending in a first direction; a pressure sensing layer disposed on the first resistive layer and a second resistive layer disposed on the pressure sensing layer and extending in a second direction intersecting the first direction.

The pressure sensing layer may substantially be an insulator when an external force is not applied to the second display panel.

The resistance of the pressure sensing layer may be reduced when an external force is applied to the second display panel, such that current flows between the first resistive layer and the second resistive layer.

A color filter and a light blocking member disposed on the lower surface of the second display panel may be further included.

The first display panel may include a thin film transistor and a pixel electrode.

The pressure sensing layer comprises a quantum tunneling composite material having a resistance that varies according to an amount of force applied thereto.

A manufacturing method of a liquid crystal display, according to another exemplary embodiment of the present invention, includes: forming a first display panel including lower resistive layers arranged in parallel on a first substrate; forming a second display panel including upper resistive layers arranged in parallel on a second substrate and sensing spacers disposed on the upper resistive layers; combining the first display panel and the second display panel, such that the sensing spacers connect the lower resistive layers and the upper resistive layers; and forming a liquid crystal layer in a cell gap between the first display panel and the second display panel.

The sensing spacer may be formed of a material that is substantially an insulator when an external force is not applied to the second display panel.

The thickness of the sensing spacer may be substantially the same as the thickness of the cell gap.

The forming of the first display panel may include: forming a thin film transistor on the first substrate; forming an insulating layer on the thin film transistor; depositing a first conductive layer on the insulating layer; and patterning the first conductive layer to form pixel electrodes and the lower resistive layers, the lower resistive layers being disposed between the pixel electrodes.

The forming of the second display panel may include: forming a light blocking member and a color filter on the second substrate; forming a common electrode on the color filter; forming an insulating layer on the common electrode; depositing and patterning a second conductive layer on the insulating layer to form the upper resistive layers; and forming the sensing spacer on the upper resistive layer.

A manufacturing method of a liquid crystal display, according to another exemplary embodiment of the present invention, includes: forming first resistive layers in parallel on an upper surface of an upper substrate; forming a pressure sensing layer on the first resistive layers; and forming second resistive layers in parallel on the pressure sensing layer, the second resistive layers extending across the first resistive layers.

The pressure sensing layer may be formed to cover the entire upper surface of the upper substrate in which the first resistive layer is disposed.

The method may further include: forming a light blocking member and a color filter on a lower surface of the upper substrate, to form an upper panel; forming a thin film transistor and a pixel electrode on a lower substrate, to form a lower panel; combining the lower panel and the upper panel, so as to form a cell gap therebetween, and forming a liquid crystal layer in the cell gap.

According to an exemplary embodiment of the present invention, a variable touch display may be realized, such that expression according to intensity of an applied pressure is possible, as well simplified touch detection. A touch function is provided in a liquid crystal display, and thereby the weight and thickness thereof may be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Figure 1:
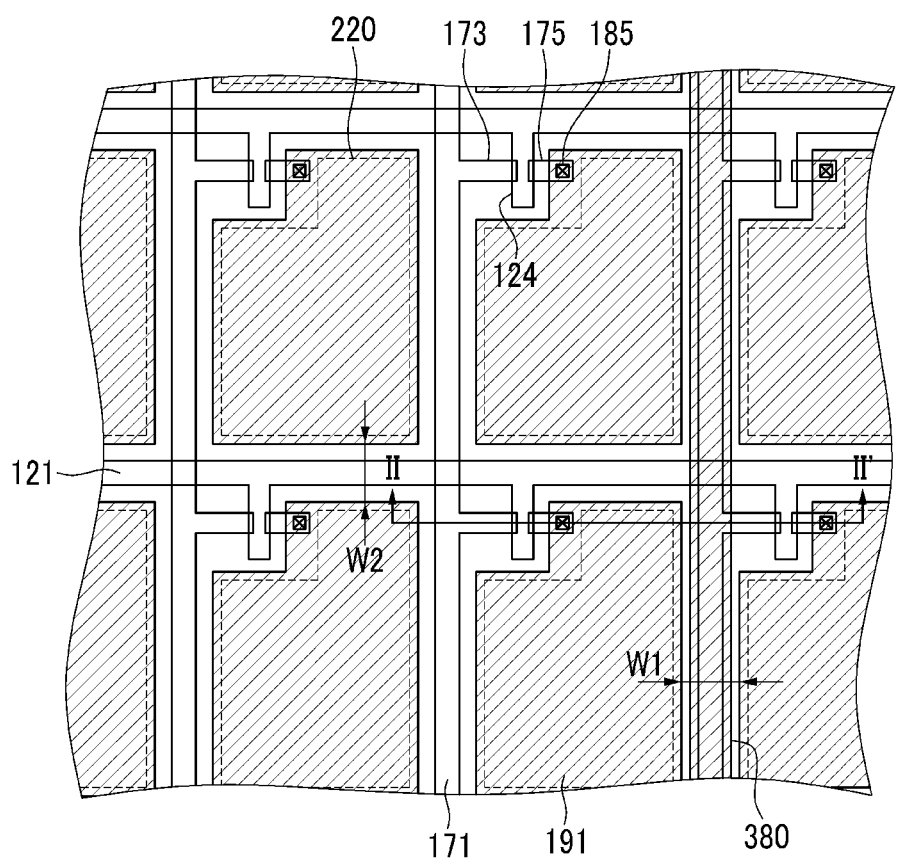
FIG. 1 is a top plan view of a liquid crystal display, according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
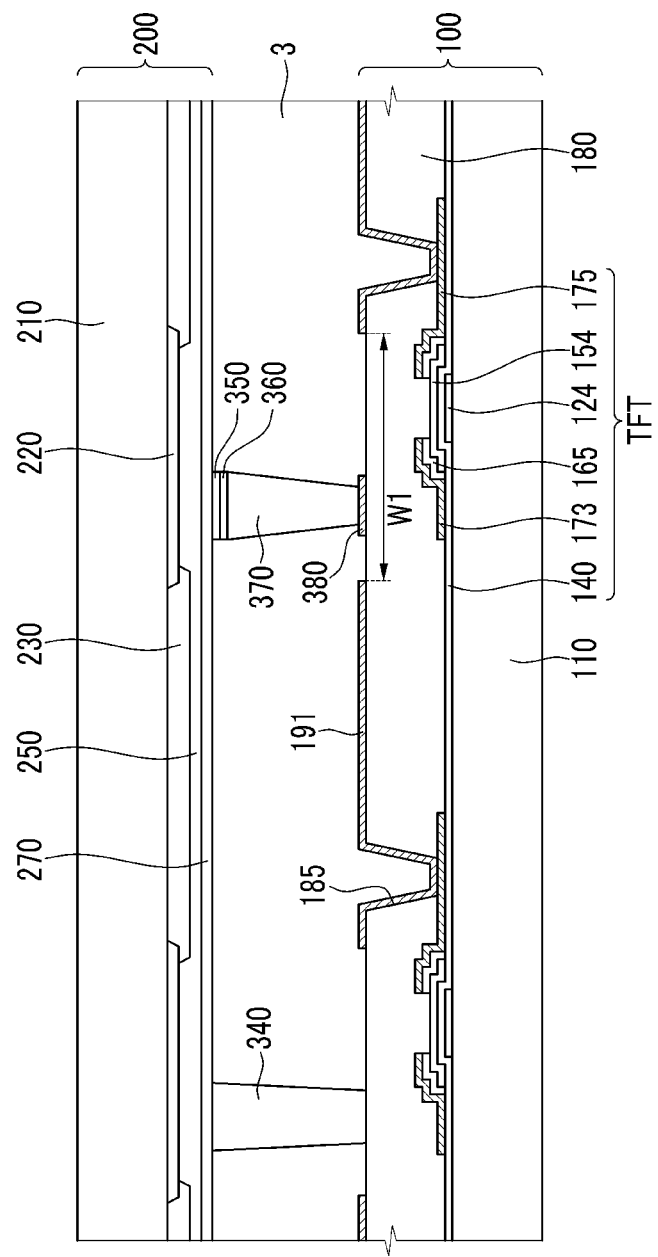
FIG. 2 is a cross-sectional view taken along the line II-II' of FIG. 1.
Figure 3:
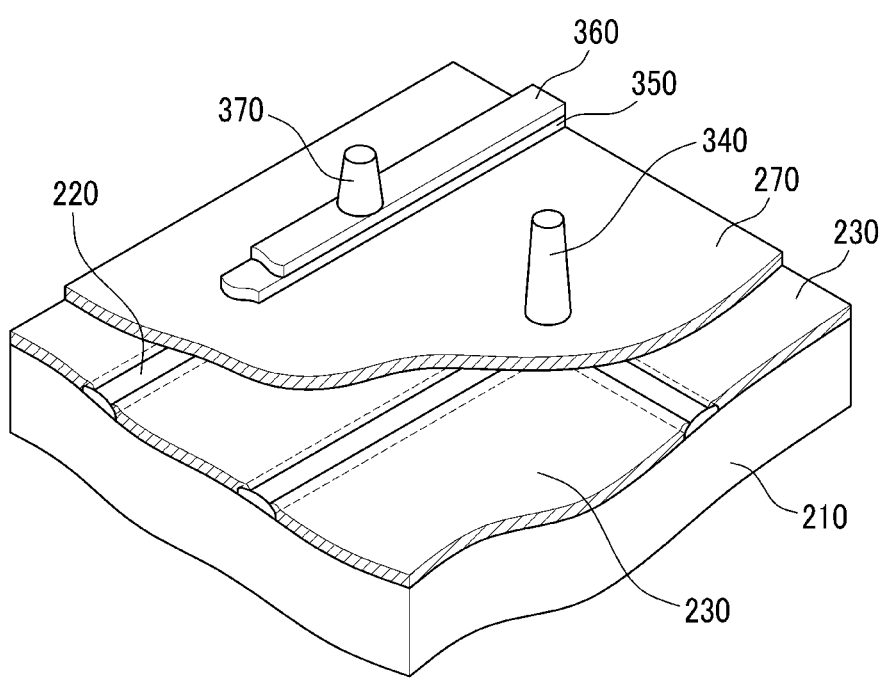
FIG. 3 is a partial perspective view of the color filter display panel shown in FIG. 1 and FIG. 2.
Figure 4:
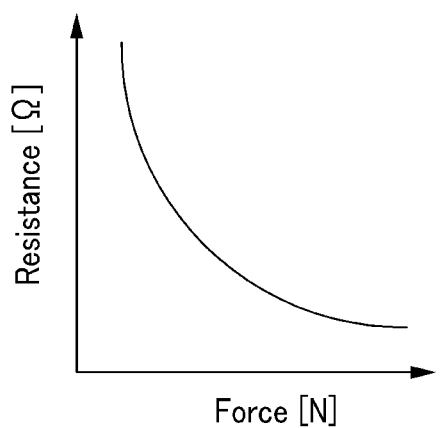
FIG. 4 is a graph showing a characteristic of a material forming a sensing spacer explained in the exemplary embodiment of FIGS. 1 to 3.

FIG. 1 is a top plan view of a liquid crystal display, according to an exemplary embodiment of the present invention. FIG. 2 is a cross-sectional view taken along the line II-II' of FIG. 1. FIG. 3 is a partial perspective view of the color filter display panel shown in FIG. 1 and FIG. 2. FIG. 4 is a graph showing a characteristic of a material forming a sensing spacer of FIGS. 1 to 3.

Referring to FIGS. 1 to 3, a liquid crystal display, according to the present exemplary embodiment, includes: a first display panel 100 (thin film transistor array panel) including a thin film transistor (TFT); a second display panel 200 (color filter display panel) facing the first display panel 100 and including a plurality of color filters 230 formed on a surface facing the first display panel 100; and a liquid crystal layer 3 formed between the first display panel 100 and the second display panel 200. The liquid crystal layer 3 includes liquid crystal molecules (not shown).

The first display panel 100 includes a first insulation substrate 110, the thin film transistor (TFT) disposed on the first insulation substrate 110, an insulating layer 180 formed on the thin film transistor (TFT), pixel electrodes 191 disposed on the insulating layer 180, and a lower resistive layer 380 between the pixel electrodes 191.

The thin film transistor (TFT) includes a gate electrode 124 protruded from a gate line 121 extending in a first direction on the first insulation substrate 110, a gate insulating layer 140 deposited on the whole surface of the first insulation substrate 110 and covering the gate electrode 124, a semiconductor layer 154 and a resistance contact pattern 165 sequentially deposited on the gate insulating layer 140, a source electrode 173 branched from a data line 171 and extending in a second direction intersecting the first direction on the first insulation substrate 110, and a drain electrode 175.

The insulating layer 180 has a contact hole 185 exposing the drain electrode 175 of the thin film transistor (TFT). The pixel electrode 191 may be made of indium tin oxide (ITO) or indium zinc oxide (IZO), and may be electrically connected to the drain electrode 175 of the thin film transistor (TFT), through the contact hole 185 of the insulating layer 180. The pixel electrode 191 is separated from an adjacent pixel electrode 191 in the first direction, by a first interval W1, and in the second direction by a second interval W2.

The lower resistive layer 380 may be formed of the same material as the pixel electrode 191 and extends in the second direction, between the pixel electrodes 191. That is, the lower resistive layer 380 may be formed in the same plane as the pixel electrode 191, on the data line 171. The width of the lower resistive layer 380 is smaller than the first interval W1 between the pixel electrodes 191, to prevent a short between the lower resistive layer 380 and the pixel electrode 191.

The second display panel 200 includes: a second insulation substrate 210 made of the same material as the first insulation substrate 110; a light blocking member 220 disposed on the second insulation substrate 210 and arranged in a matrix; red, green, and blue color filters 230 formed on the second insulation substrate 210; a common electrode 270 formed on the color filters 230, to apply a voltage to a portion of the liquid crystal layer 3 corresponding to the pixel electrode 191; a cell gap spacer 340 to maintain a uniform cell gap between the second display panel 200 and the first display panel 100; and a sensing spacer 370 physically connecting the lower resistive layer 380 of the first display panel 100 and an upper resistive layer 360 disposed on the second display panel 200.

The cell gap spacer 340 is formed on the common electrode 270 of the second display panel 200, between the pixel electrodes 191. Accordingly, a uniform cell gap between the second display panel 200 and the first display panel 100 is maintained. The cell gap spacer 340 may be formed to overlap the light blocking member 220, so as to not reduce light transmittance.

The upper resistive layer 360 is formed on the common electrode 270 and extends in the same direction as the lower resistive layer 380. The upper resistive layer 360 faces the lower resistive layer 380 and may overlap the light blocking member 220, so as to not reduce the light transmittance of the liquid crystal display.

The upper resistive layer 360 is conductive. As such, an insulating layer 350 is disposed between the upper resistive layer 360 and the common electrode 270, to prevent a short with the common electrode 270.

The insulating layer 350 is bar-shaped and is formed along the edges color filters 230, on the common electrode 270. The upper resistive layer 360 faces the lower resistive layer 380 and is formed on the insulating layer 350. The sensing spacer 370 physically connects the lower resistive layer 380 and the upper resistive layer 360.

The insulating layer 350 and the upper resistive layer 360 may extend across the lower resistive layer 380. The sensing spacer 370 is formed on the upper resistive layer 360 and contacts the lower resistive layer 380. Also, the sensing spacer 370 connects the upper resistive layer 360 and the lower resistive layer 380. However, the sensing spacer 370 is generally disposed to overlap the light blocking member 220, which has a matrix shape extending in the horizontal direction and the vertical direction.

The sensing spacer 370 is substantially an insulator when external pressure is not applied thereto. Herein, external pressure refers to an external force applied to the display apparatus by, for example, a finger of a user or a touch pen, but excludes atmospheric pressure.

The sensing spacer 370 may be made of a material having an electrical resistance that changes according to the pressure being applied thereto, such as when external pressure is applied to the second display panel 200. Particularly, as shown in FIG. 4, the sensing spacer 370 may be made of a material that has a reduced resistance when pressure is applied, such that current flows therethrough.

Accordingly, if external pressure is applied to the second display panel 200, the sensing spacer 370 is compressed, such that the current flows. As a result, the sensing spacer 370 electrically connects the lower resistive layer 380 and the upper resistive layer 360, such that the voltage change generated by the current flowing between the lower resistive layer 380 and the upper resistive layer 360 is measured, thereby detecting the input position of the external pressure (input position of a user).

For example, the sensing spacer 370 may include a quantum tunneling composite (QTC) material manufactured by Peratech Limited. The QTC material is manufactured by combining metal particles of a surface protrusion within an elastic binder, such as silicon rubber. The resistance thereof is more than 1012 ohms ($\Omega$) when pressure is not applied, such that the QTC material is almost an insulator. However, if pressure is applied, the electrical conductivity is quickly increased by the quantum tunneling effect between the protrusions of the surface of the metal particles.

Figure 5:
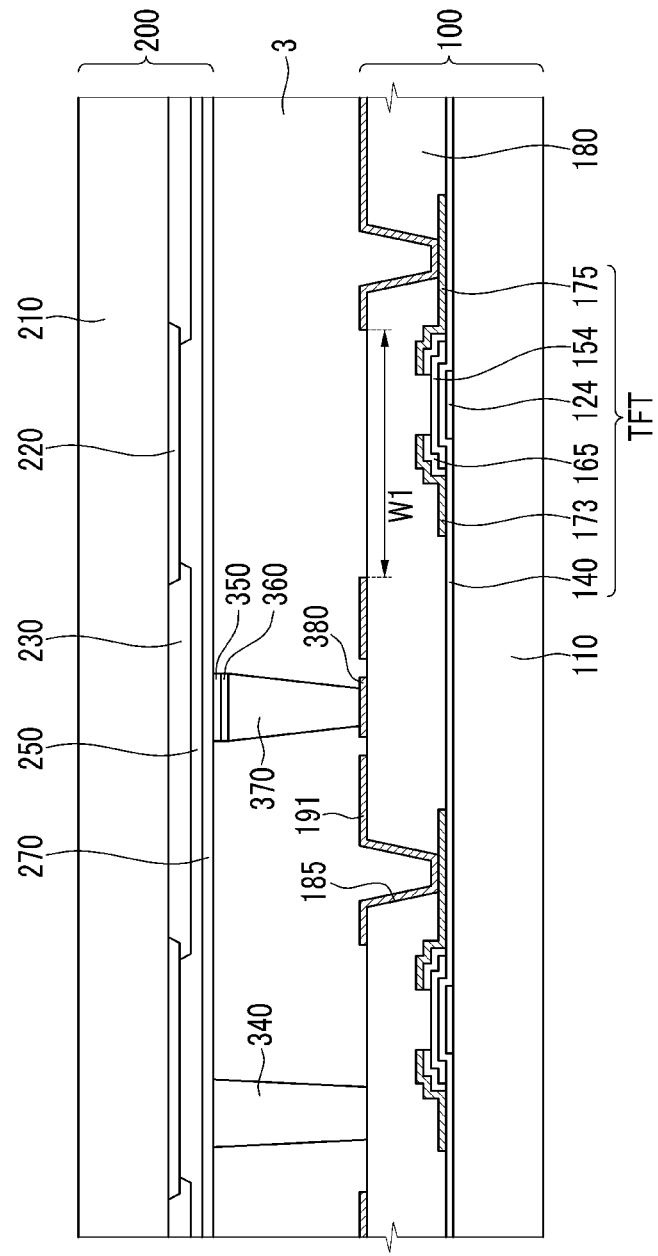
FIG. 5 is a cross-sectional view taken along the line II-II' of FIG. 1, according to another exemplary embodiment of the present invention.

FIG. 5 is a cross-sectional view taken along the line II-II' of FIG. 1, according to another exemplary embodiment of the present invention. Referring to FIG. 5, a lower resistive layer 380 may be disposed within a region in which a pixel electrode 191 of a first display panel 100 is formed, and the lower resistive layer 380 is separated from the pixel electrode 191, unlike an exemplary embodiment of FIGS. 1 to 3. Also, an upper resistive layer 360 and a sensing spacer 370 may be formed on the second display panel 200 corresponding to the lower resistive layer 380.

Figure 6:
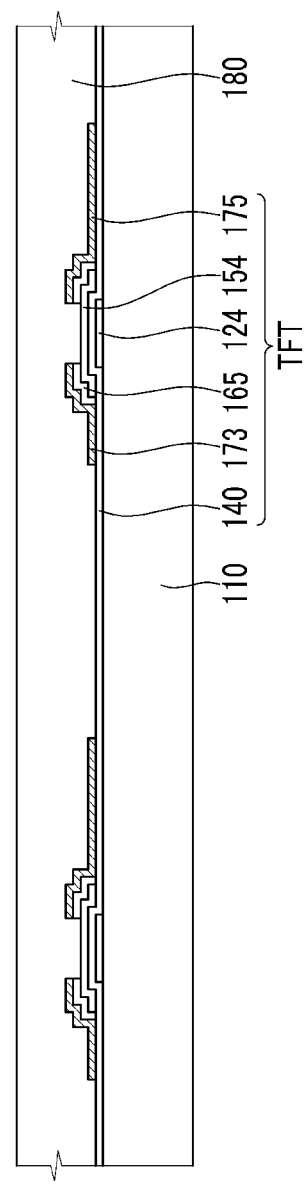
FIGS. 6, 7, 8, 9 10, 11, 12, 13 and 14 are cross-sectional views showing a manufacturing method of a liquid crystal display, according to another exemplary embodiment of the present invention.

FIGS. 6 to 14 are cross-sectional views showing a manufacturing method of the liquid crystal display of FIGS. 1 to 4, according to an exemplary embodiment of the present invention. Referring to FIG. 6, a first metal layer formed of, for example, aluminum (Al), an aluminum alloy, silver (Ag), a silver alloy, copper (Cu). a copper alloy, molybdenum (Mo), a molybdenum alloy, chromium (Cr), titanium (Ti), tantalum (Ta), etc., is deposited on the first insulation substrate 110.

The first metal layer is patterned to form a gate line (not shown) and the gate electrode 124 protruding from the gate line. Next, silicon nitride is deposited on the whole surface of the first insulation substrate 110 including the gate electrode 124, by plasma chemical vapor deposition (PECVD), to form the gate insulating layer 140.

An amorphous silicon layer and a silicide or an amorphous silicon layer doped with a high concentration of a n-type impurity are sequentially deposited on the gate insulating layer 140, by a plasma chemical vapor deposition, and then patterned to form the semiconductor layer 154 and the resistance contact pattern 165 on the gate insulating layer 140.

Sequentially, a second metal layer formed of the same material as the first metal layer is deposited on the whole surface of the resulting object. The second metal layer is patterned to form a data line (not shown) intersecting the gate line, the source electrode 173 branched from the data line, and the drain electrode 175. Accordingly, a thin film transistor (TFT) including the gate electrode 124, the semiconductor layer 154, the resistance contact pattern 165, the source electrode 173, and the drain electrode 175 is completed. Here, the gate insulating layer 140 is provided between the gate line and the data line, such that the gate line and the data line are prevented from contacting each other. Next, a passivation layer 180 is formed on the whole surface of the first insulation substrate 110 and the TFT.

Figure 7:
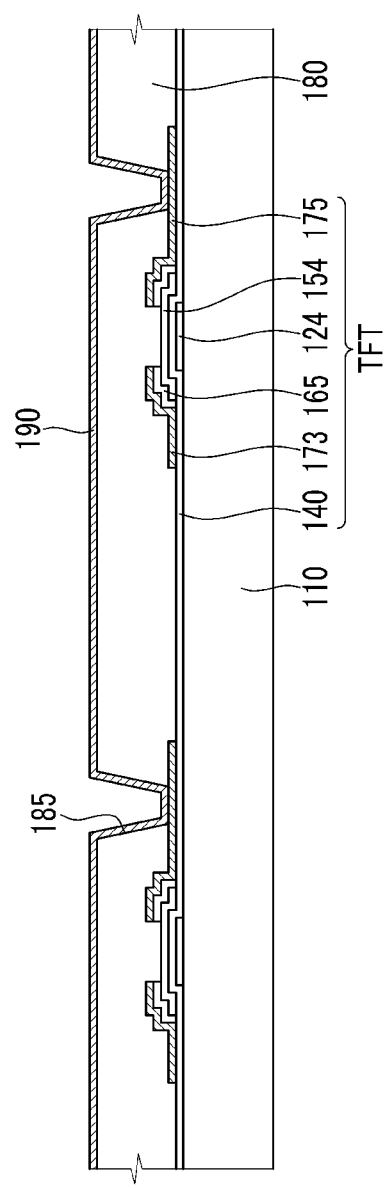

Referring to FIG. 7, a first mask (not shown) is disposed on the insulating layer 180. The first mask is then used to form the contact hole 185 in the passivation layer 180 partially exposing the drain electrode 226, through an exposing and developing process. A transparent electrode layer 190 made of ITO or IZO is then deposited on the passivation layer 180 and in the contact hole 185.

Figure 8:
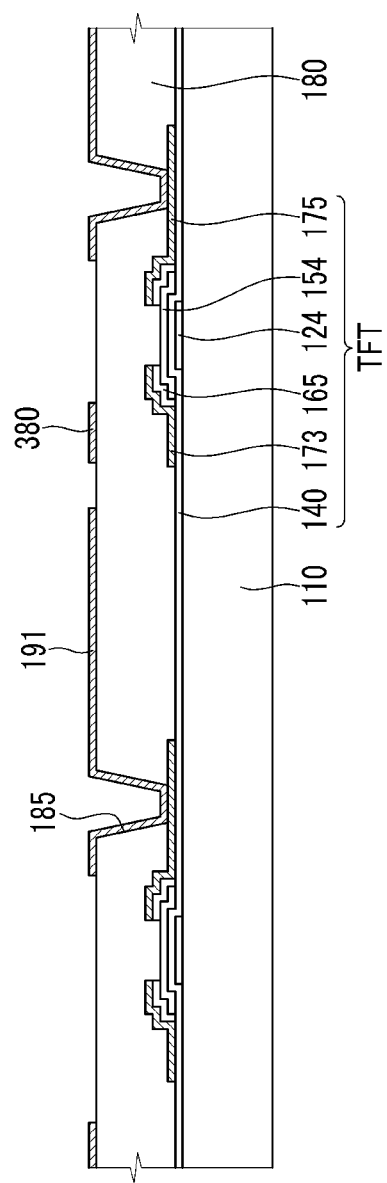

Referring to FIG. 8, the transparent electrode layer 190 is patterned to form the pixel electrode 191 and the lower resistive layer 380. Here, pixel electrodes 191 are separated by the first interval W1, to prevent a short between the pixel electrode 191 and the lower resistive layer 380. The lower resistive layer 380 is formed in the first intervals W1. As such, the first display panel 100 is completed.

Figure 9:
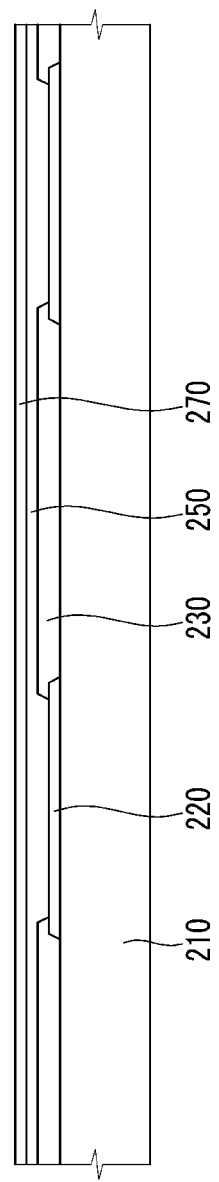

FIG. 9 to FIG. 14 are cross-sectional views to explain a manufacturing process of the second display panel 200 shown in FIG. 2. Referring to FIG. 9, the light blocking member 220 is formed on the second insulation substrate 210. The color filters 230 overlapping the edges of the light blocking member 220 are then formed. The overcoat 250 may be formed on the color filters 230. The overcoat 250 may be omitted, according to some aspects.

The common electrode 270 is formed on the overcoat 250. The common electrode 270 may be formed of ITO or IZO (the same material as the pixel electrode 191).

Figure 10:
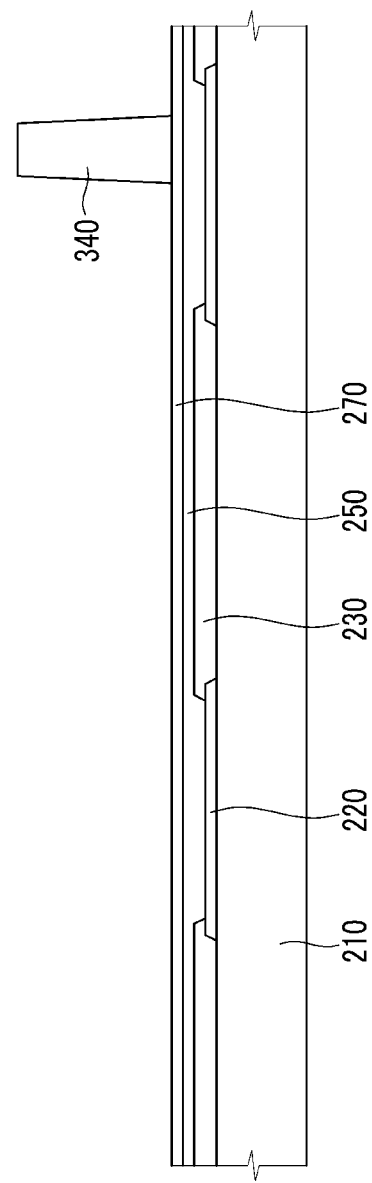

Referring to FIG. 10, an organic insulator is coated on the whole surface of the second display panel 200, including the common electrode 270. Next, a pattern is formed in the organic insulator through a exposing and developing process, to form the cell gap spacer 340. The cell gap spacer 340 may be formed to overlap the light blocking member.

Figure 11:
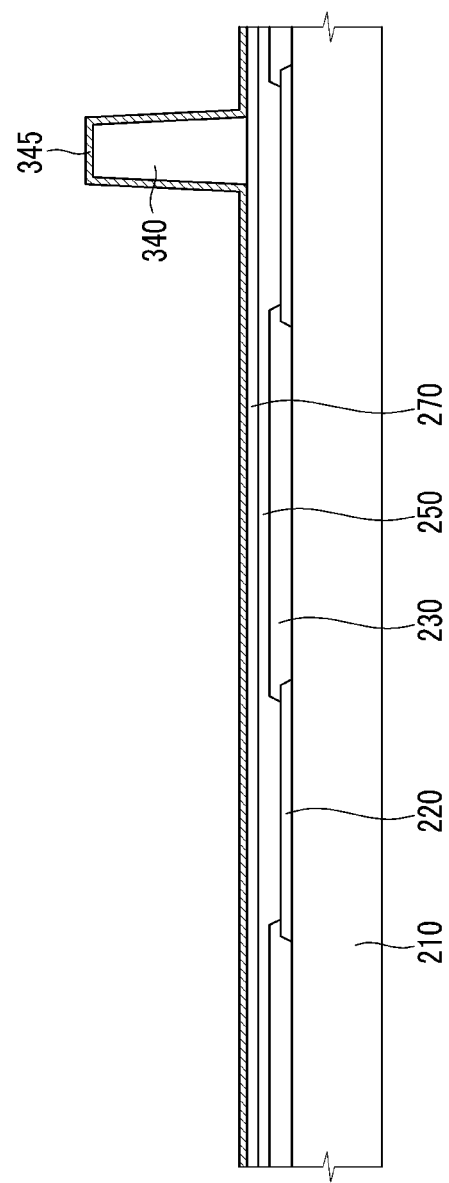
Figure 12:
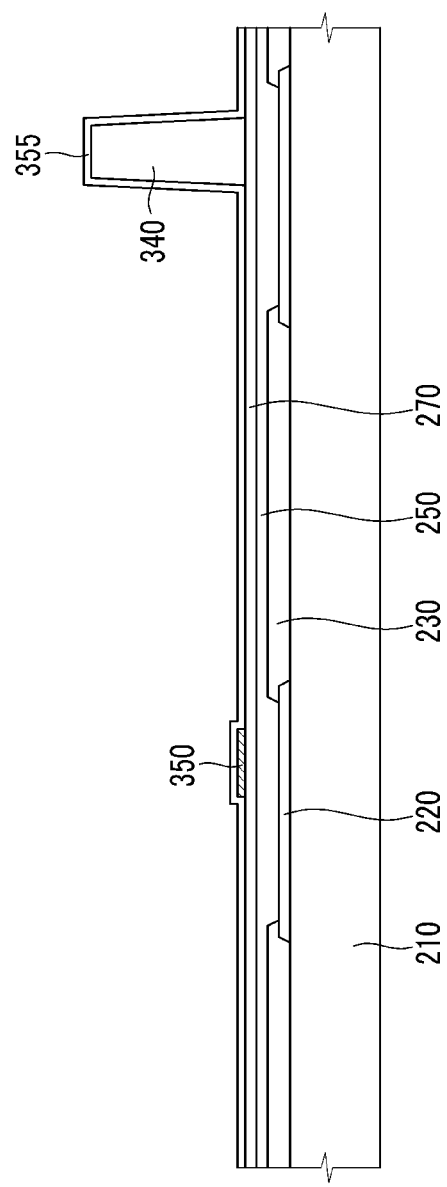

Referring to FIG. 11 and FIG. 12, an insulating resin 345 is coated on the whole surface of the common electrode 270 and the cell gap spacer 340. Next, the insulating resin 345 is patterned to form the insulating layer 350 around edges of the color filter 230. The insulating layer 350 may be formed to have the same shape as the lower resistive layer 380.

Next, a first metal layer 355 is formed on the second display panel 200 including the insulating layer 350. The first metal layer 355 is electrically connected to the common electrode 270. The first metal layer 355 is patterned to form the upper resistive layer 360 on the insulating layer 350. The upper resistive layer 360 is disposed to face the lower resistive layer 380. The upper resistive layer 360 is electrically insulated from the common electrode 270 by the insulating layer 350.

The insulating layer 350 and the upper resistive layer 360 may extend across the lower resistive layer 380. The upper resistive layer 360/first metal layer 355 may be formed of ITO or IZO.

Figure 13:
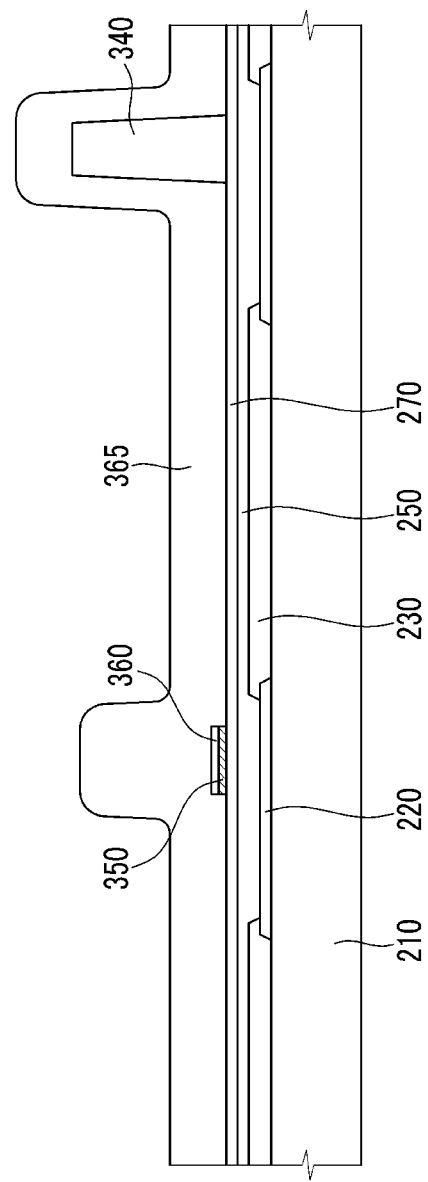
Figure 14:
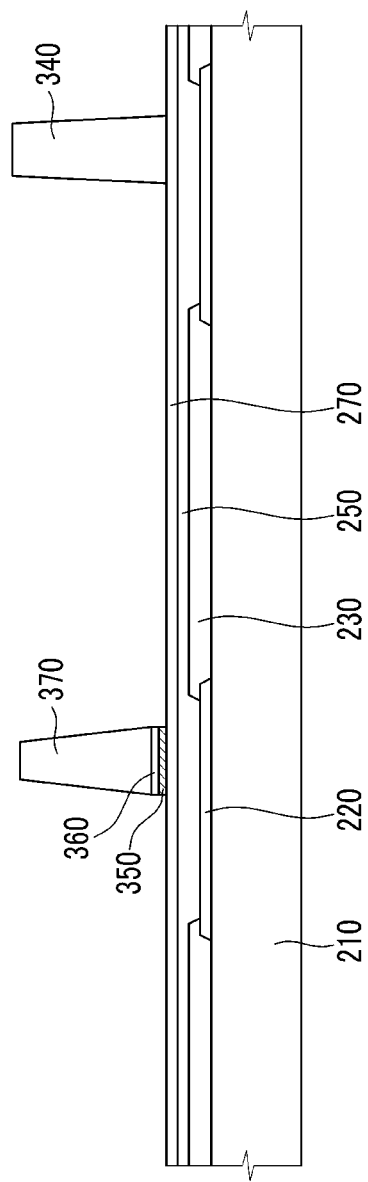

Referring to FIG. 13 and FIG. 14, a second metal layer 365 is deposited on the common electrode 270 and the upper resistive layer 360. The portion of the second metal layer 365 disposed on the upper resistive layer 360 is formed to have the same height (thickness) as the cell gap spacer 340.

The second metal layer 365 is patterned to form the sensing spacer 370 having substantially a same height as the cell gap spacer 340. The sensing spacer 370 is disposed on the upper resistive layer 360. Accordingly, the second display panel 200, including the cell gap spacer 340 and the sensing spacer 370 having substantially the same height, is completed.

Figure 15:
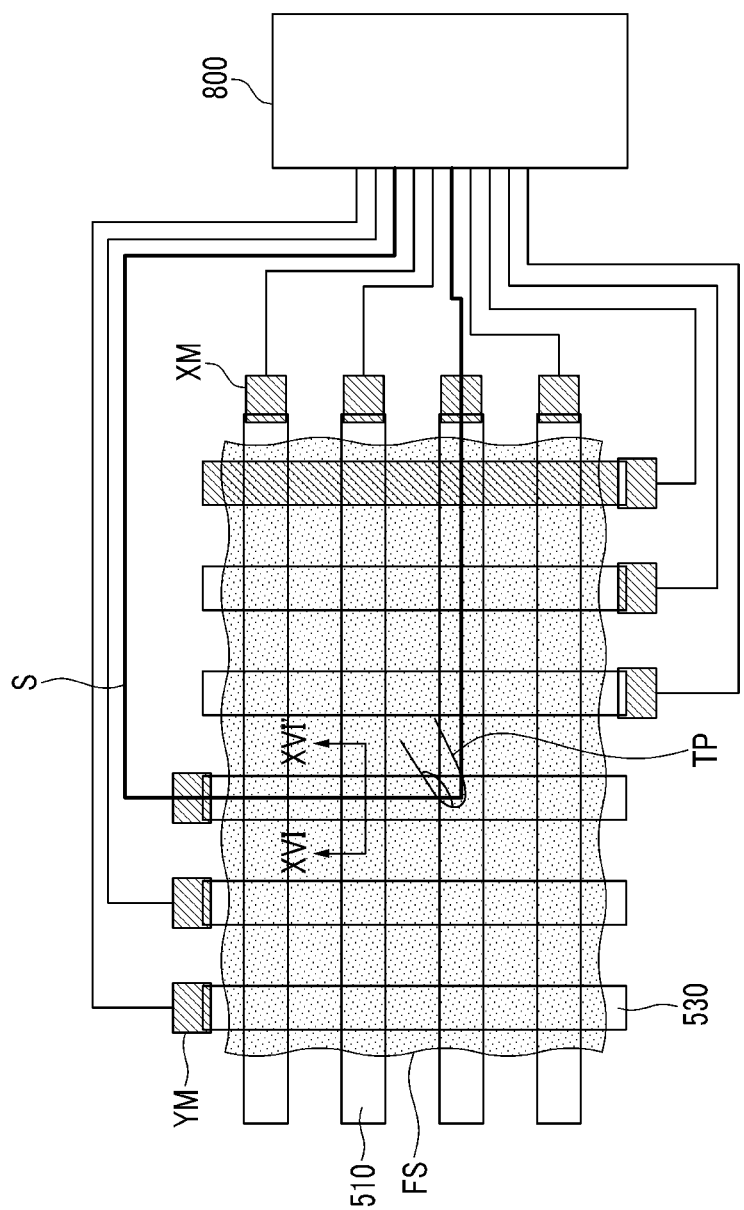
FIG. 15 is a schematic layout view of an upper surface of a color filter substrate of a liquid crystal display, according to another exemplary embodiment of the present invention.
Figure 16:
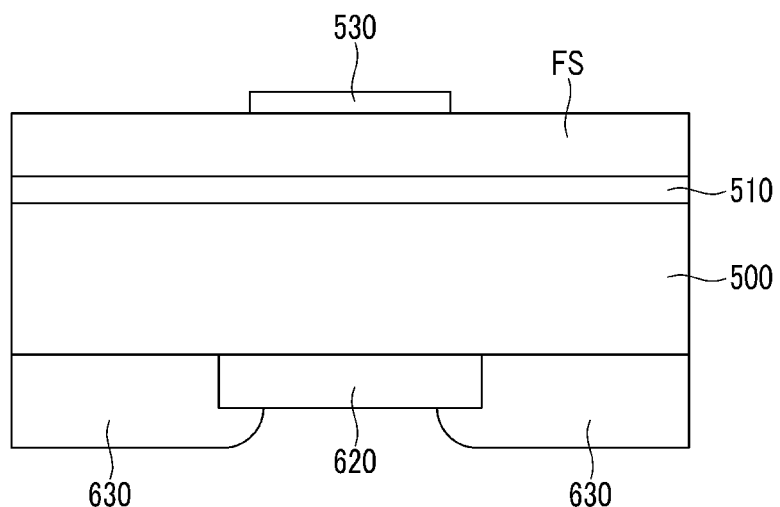
FIG. 16 is a cross-sectional view taken along the line XV-XV' of FIG. 14.

The first display panel 100 and the second display panel 200 are combined and the liquid crystal layer is injected therebetween. As such, the liquid crystal display shown in FIG. 2 is completed FIG. 15 is a schematic layout view of an upper surface of a color filter substrate of a liquid crystal display, according to another exemplary embodiment of the present invention. FIG. 16 is a cross-sectional view taken along the line XV-XV' of FIG. 15.

Referring to FIG. 15 and FIG. 16, a first resistive layer 510 is disposed on the upper surface of an insulation substrate 500 and extends in a first direction. A pressure sensing layer FS is formed on the first resistive layer 510 and the upper surface of the insulation substrate 500. A second resistive layer 530 on the pressure sensing layer FS and extends in a second direction intersecting the first direction.

The first resistive layer 510 and the second resistive layer 530 may be formed of the transparent material, such as ITO and IZO. The pressure sensing layer FS is substantially an insulator when external pressure is not applied thereto. The pressure sensing layer FS may be formed of a material of which the resistance changes according to the pressure. That is, the pressure sensing layer FS may be formed of the same material as the sensing spacer 370.

The first electrode XM is connected to the end of the first resistive layer 510, and the second electrode YM is connected to the end of the second resistive layer 530. A circuit line is connected to a controller 800 through the first electrode XM and the second electrode YM, thereby transmitting the signal.

In the case that the insulation substrate 500 is contacted by the finger of the user at a touch point TP, the current flows to the pressure sensing layer FS. As such, the first resistive layer 510 and the second resistive layer 530 are electrically connected to each other. Here, the change of the voltage that is generated by the current flowing to the first resistive layer 510 and the second resistive layer 530 is measured, thereby detecting the input position of the user. The pressure sensing layer FS covers the whole upper surface of the insulation substrate 500. However, the current only flows at the portion of the pressure sensing layer FS corresponding to the touch point TP, such that the input position of the user may be detected.

A light blocking member 620 and a color filter 630 are disposed on a rear surface of the insulation substrate 500. Although not shown, the description for the first display panel in FIG. 2 may be applied to the present exemplary embodiment. Most of the description, except for the constitution of the sensing spacer between the first display panel and the second display panel, in the exemplary embodiment of FIG. 1 to FIG. 4 is applied to the present exemplary embodiment. However, the pressure sensing layer corresponding to the sensing spacer in the present exemplary embodiment is disposed on the upper surface of the second display panel, which is different from the previous exemplary embodiment.

FIGS. 17A to 20B are plane views and cross-sectional views showing a manufacturing method of the liquid crystal display of FIG. 15 and FIG. 16, according to another exemplary embodiment of the present invention. Referring to FIG.

Figure 17A:
FIGS. 17A, 17B, 18A, 18B, 19A, 19B, 20A and 20B are plane views and cross-sectional views showing a manufacturing method of a liquid crystal display, according to another exemplary embodiment of the present invention.
Figure 17B:
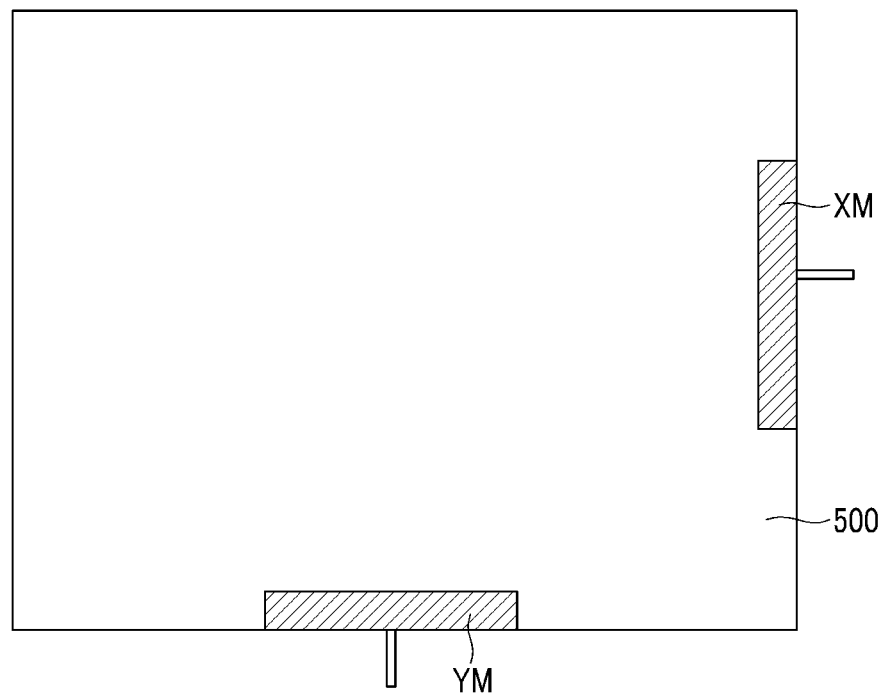

17A and FIG. 17B, the first metal layer is deposited and patterned on an insulation substrate 500, to form the first electrode XM and the second electrode YM at edge portions of the insulation substrate 500.

Figure 18A:
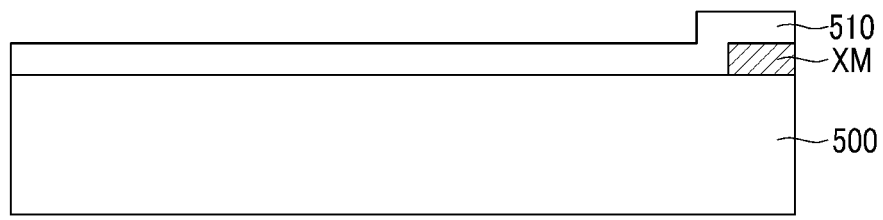
Figure 18B:
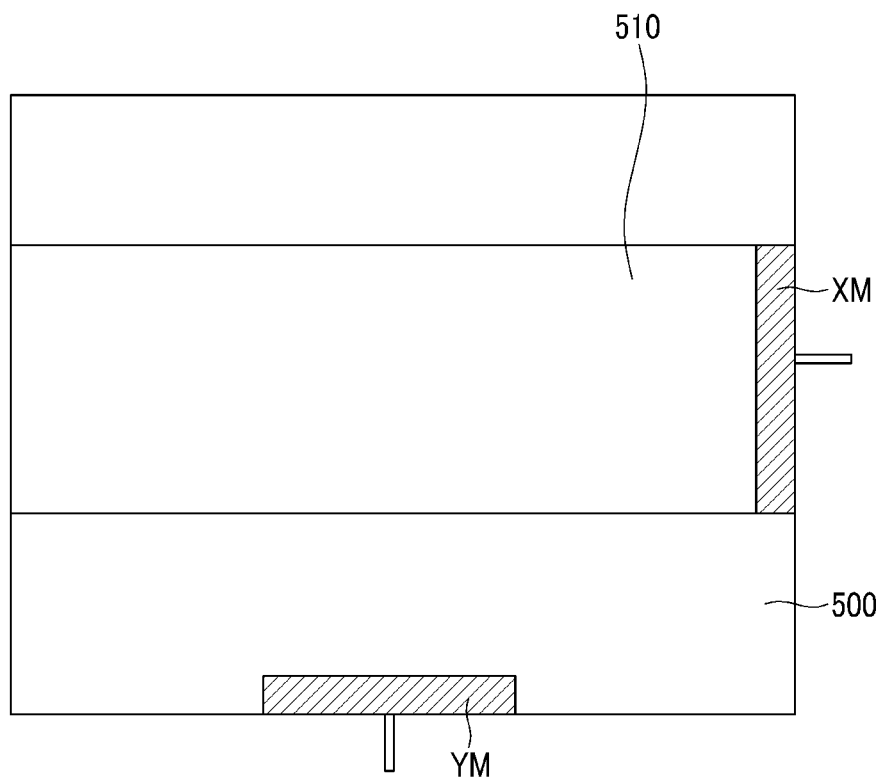

Referring to FIG. 18A and FIG. 18B, the first transparent conductive layer is deposited and patterned on the insulation substrate 500, to form the first resistive layer 510. Here, the first resistive layer 510 is physically connected to the first electrode XM.

Figure 19A:
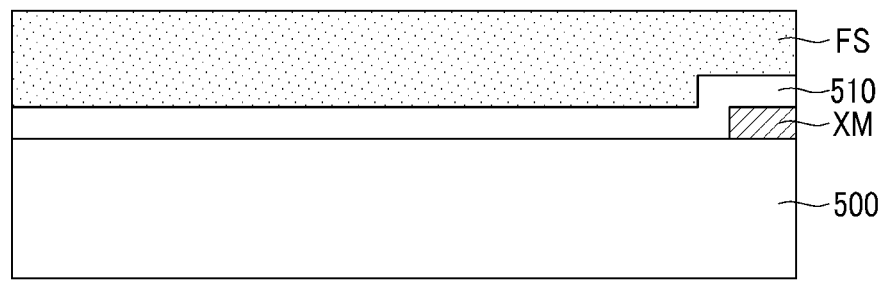
Figure 19B:
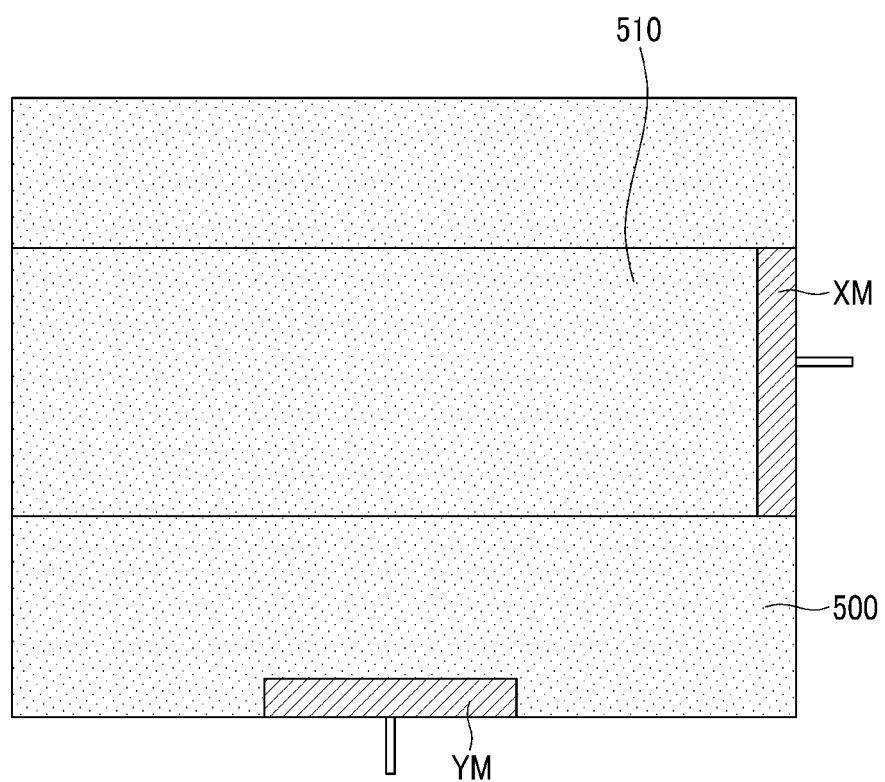

Referring to FIG. 19A and FIG. 19B, the pressure sensing layer FS is deposited on the entire area on the insulation substrate 500. However, the second electrode YM may be exposed. This is how the second resistive layer 530 will be physically connected to the second electrode YM.

The pressure sensing layer FS may be formed of a material of which the resistance is changed according to the pressure, however it is substantially an insulator in the state that the external pressure is not applied. That is, like the sensing spacer 370, the pressure sensing layer FS may be formed of the material of which the resistance is decreased and thereby the current flows, as the applied pressure (force) is increased.

Figure 20A:
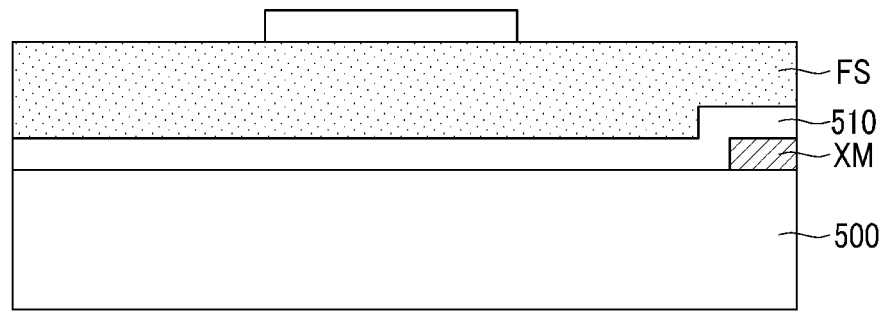
Figure 20B:
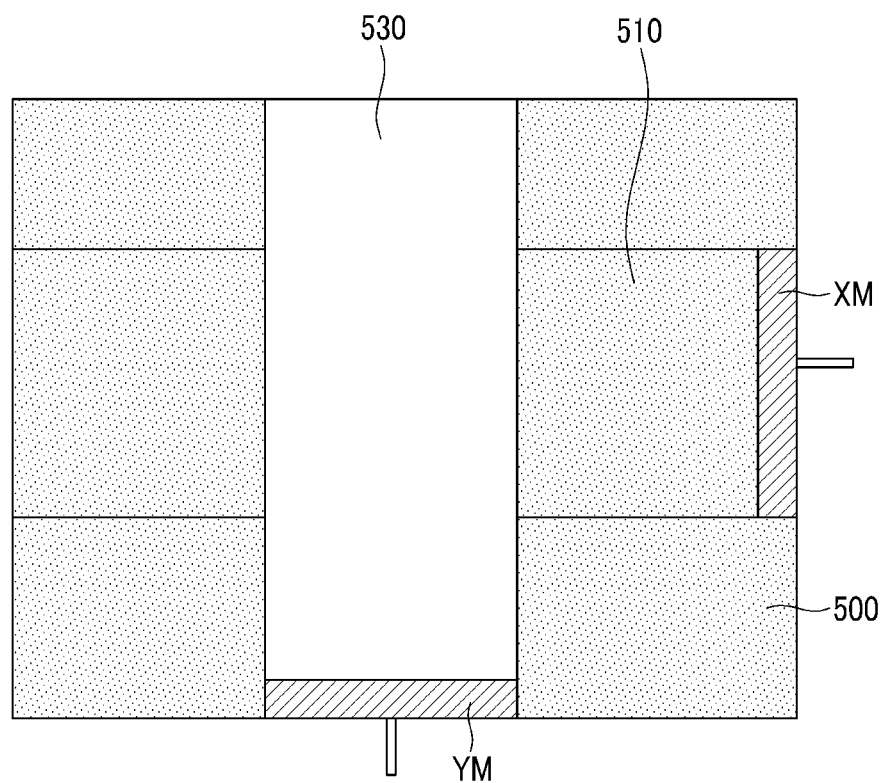

Referring to FIG. 20A and FIG. 20B, the second transparent conductive layer is deposited and patterned on the pressure sensing layer FS, to form the second resistive layer 530. Here, the second resistive layer 530 is formed to be physically connected to the second electrode YM.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
   a first display panel comprising a thin film transistor and pixel electrodes;
   a second display panel facing the first display panel across a cell gap;
   a lower resistive layer disposed on the first display panel;
   an upper resistive layer disposed on the second display panel; and
   a sensing spacer connecting the lower resistive layer and the upper resistive layer,
   wherein a resistance of the sensing spacer changes in accordance with an amount of external force that is applied to the second display panel.

2. The liquid crystal display of claim 1, wherein the sensing spacer is substantially an insulator when an external force is not applied thereto.

3. The liquid crystal display of claim 1, wherein a resistance of the sensing spacer is reduced when an external force is applied to the second display panel, resulting in current flow between the upper resistive layer and the lower resistive layer.

4. The liquid crystal display of claim 1, wherein a thickness of the sensing spacer is substantially a same as the thickness of the cell gap.

5. The liquid crystal display of claim 1, wherein the sensing spacer directly contacts the lower resistive layer and the upper resistive layer.

6. The liquid crystal display of claim 1, further comprising a cell gap spacer disposed on at least one of the first display panel and the second display panel to maintain the cell gap.

7. The liquid crystal display of claim 1, wherein the second display panel comprises:
   a light blocking member and a color filter,
   wherein the sensing spacer is disposed at a region overlapping the light blocking member.

8. The liquid crystal display of claim 1, wherein the lower resistive layer is disposed between the pixel electrodes.

9. The liquid crystal display of claim 8, wherein the lower resistive layer is disposed at a same layer as the pixel electrodes.

10. The liquid crystal display of claim 1, wherein the sensing spacer comprises a quantum tunneling composite material having a resistance that varies according to an amount of force applied thereto.

11. A method for manufacturing a liquid crystal display, comprising:
    forming a first display panel comprising lower resistive layers arranged in parallel on a first substrate;
    forming a second display panel comprising upper resistive layers arranged in parallel on a second substrate and sensing spacers disposed on the upper resistive layers;
    combining the first display panel and the second display panel, such that the sensing spacers connect the lower resistive layers and the upper resistive layers; and
    forming a liquid crystal layer in a cell gap between the first display panel and the second display panel,
    wherein a resistance of the sensing spacers changes in accordance with an amount of external force that is applied to the second display panel.

12. The method of claim 11, wherein the sensing spacers comprise a material that is substantially an insulator when an external force is not applied thereto.

13. The method of claim 11, wherein a thickness of the sensing spacers is substantially the same as the thickness of the cell gap.

14. The method of claim 11, wherein the forming of the first display panel comprises:
    forming a thin film transistor on the first substrate;
    forming an insulating layer on the thin film transistor;
    depositing a first conductive layer on the insulating layer; and
    patterning the first conductive layer to form pixel electrodes and the lower resistive layers, the lower resistive layers being disposed between the pixel electrodes.

15. The method of claim 11, wherein the forming of the second display panel comprises:
    forming a light blocking member and a color filter on the second substrate;
    forming a common electrode on the color filter;
    forming an insulating layer on the common electrode;
    depositing and patterning a second conductive layer on the insulating layer to form the upper resistive layers; and
    forming the sensing spacers on the upper resistive layers.

* * * * *